(12) United States Patent
Gylleby et al.

(10) Patent No.: US 12,478,450 B2
(45) Date of Patent: Nov. 25, 2025

(54) MONITORING OF SHARPS CONTAINER USING MULTIPLE ANTENNAS

(71) Applicant: SHL Medical AG, Zug (CH)

(72) Inventors: Stefan Gylleby, Åkersberga (SE); Rasmus Renstad, Nacka Strand (SE); Plamen Balkandijev, Nacka Strand (SE); Daniel Carlsson, Nacka Strand (SE)

(73) Assignee: SHL Medical AG, Zug (CH)

( * ) Notice: Subject to any disclaimer, the term of this patent is extended or adjusted under 35 U.S.C. 154(b) by 0 days.

(21) Appl. No.: 18/706,840

(22) PCT Filed: Oct. 31, 2022

(86) PCT No.: PCT/EP2022/080346
§ 371 (c)(1),
(2) Date: May 2, 2024

(87) PCT Pub. No.: WO2023/078828
PCT Pub. Date: May 11, 2023

(65) Prior Publication Data
US 2025/0009460 A1 Jan. 9, 2025

(30) Foreign Application Priority Data
Nov. 3, 2021 (EP) ..................... 21206315

(51) Int. Cl.
A61B 50/36 (2016.01)
A61B 90/00 (2016.01)
(Continued)

(52) U.S. Cl.
CPC ............ *A61B 50/362* (2016.02); *A61B 90/08* (2016.02); *G06K 7/10297* (2013.01);
(Continued)

(58) Field of Classification Search
CPC ... A61B 50/362; A61B 90/08; G06K 7/10297
(Continued)

(56) References Cited

U.S. PATENT DOCUMENTS 6,250,465 B1 * 6/2001 Daniels ..................... B65F 1/10
206/370
7,528,726 B2 5/2009 Lee
(Continued)

FOREIGN PATENT DOCUMENTS

| CN | 102023296 A | 4/2011 |
|---|---|---|
| CN | 106906645 A | 6/2017 |

(Continued)

OTHER PUBLICATIONS

International Search Report and Written Opinion for corresponding PCT application No. PCT/EP2022/080346 dated Feb. 10, 2023.
(Continued)

*Primary Examiner* — Ahshik Kim
(74) *Attorney, Agent, or Firm* — McDonnell Boehnen Hulbert & Berghoff LLP

(57) ABSTRACT

The present disclosure relates to a detecting device configured for contactless detection of a used medicament delivery device accommodated in a sharps bin, said medicament delivery device being capable of wireless transmission of signals to be received at the detecting device for detecting the medicament delivery device in the sharps bin.

14 Claims, 5 Drawing Sheets

(51) Int. Cl.
*G06K 7/10* (2006.01)
*A61B 50/00* (2016.01)
(52) U.S. Cl.
CPC . *A61B 2050/005* (2016.02); *A61B 2090/0805* (2016.02); *G06K 2007/10504* (2013.01)
(58) Field of Classification Search
USPC ......................................................... 235/492
See application file for complete search history.

(56) References Cited

U.S. PATENT DOCUMENTS

| | | | |
|---|---|---|---|
| 8,201,323 B2* | 6/2012 | Miller | A61M 5/3205 |
| | | | 220/254.9 |
| 8,384,522 B2 | 2/2013 | Macauley | |
| 8,434,616 B2* | 5/2013 | Erickson | A61M 5/002 |
| | | | 220/908 |
| 8,521,620 B2 | 8/2013 | Livingston | |
| 8,749,356 B2 | 6/2014 | Hussain | |
| 8,859,913 B2 | 10/2014 | Judy | |
| 9,053,377 B2 | 6/2015 | Genetelet | |
| 9,471,820 B2 | 10/2016 | Arthaber | |
| 9,629,685 B2 | 4/2017 | Khoury | |
| 9,704,003 B1 | 7/2017 | Anderson | |
| 9,827,064 B2 | 11/2017 | DeBusk | |
| 10,019,694 B2 | 7/2018 | Elizondo | |
| 10,327,364 B2 | 6/2019 | Oishi | |
| 10,402,600 B1 | 9/2019 | Martin | |
| 10,565,410 B1 | 2/2020 | Shmulevich | |
| 10,621,394 B2 | 4/2020 | Hussain | |
| 10,943,685 B2 | 3/2021 | Gylleby | |
| 11,925,792 B2* | 3/2024 | Palmer, III | A61M 5/3278 |
| 2005/0103663 A1* | 5/2005 | Jolley | A61B 50/362 |
| | | | 206/363 |
| 2008/0001676 A1 | 1/2008 | Oh | |
| 2008/0001760 A1 | 1/2008 | Oh | |
| 2008/0139866 A1* | 6/2008 | Fisher | A61B 50/36 |
| | | | 700/214 |
| 2010/0052856 A1 | 3/2010 | Macauley | |
| 2010/0214116 A1 | 8/2010 | Huang | |
| 2014/0374294 A1* | 12/2014 | Joyce | A61B 50/36 |
| | | | 206/363 |
| 2015/0127362 A1* | 5/2015 | DeBusk | G07F 17/0092 |
| | | | 705/2 |
| 2020/0090797 A1 | 3/2020 | Gylleby | |
| 2020/0311356 A1 | 10/2020 | Hussain | |
| 2021/0015578 A1 | 1/2021 | Marchese | |
| 2021/0220573 A1 | 7/2021 | Bauss | |

FOREIGN PATENT DOCUMENTS

| | | |
|---|---|---|
| CN | 103984971 B | 9/2017 |
| CN | 112363111 A | 2/2021 |
| JP | 5169521 B2 | 3/2013 |
| JP | 2021050097 A | 4/2021 |
| JP | 2021070522 A | 5/2021 |
| WO | 2008121981 A1 | 10/2008 |
| WO | 2014204958 A1 | 12/2014 |
| WO | 2015000698 A1 | 1/2015 |
| WO | 2016098074 A1 | 6/2016 |
| WO | 2016198428 A1 | 12/2016 |
| WO | 2017173326 A1 | 10/2017 |
| WO | 2018104113 A1 | 6/2018 |
| WO | 2019023847 A1 | 2/2019 |
| WO | 2020049325 A1 | 3/2020 |
| WO | 2020206154 A1 | 10/2020 |
| WO | 2020263249 A1 | 12/2020 |

OTHER PUBLICATIONS

Bouchard et al., "Accurate Trilateration for Passive RFID Localization in Smart Homes", Int. J. Wireless Inf. Networks, 21:32-47 (2014).

Xu et al., "An RFID Indoor Positioning Algorithm Based on Bayesian Probability and K-Nearest Neighbor", Sensors, 17 (1806):1-17 (2017).

* cited by examiner

MONITORING OF SHARPS CONTAINER USING MULTIPLE ANTENNAS

CROSS-REFERENCE TO RELATED APPLICATIONS

The present application is a U.S. National Phase Application pursuant to 35 U.S.C. § 371 of International Application No. PCT/EP2022/080346 filed Oct. 31, 2022, which claims priority to European Patent Application No. 21206315.0 filed Nov. 3, 2021. The entire disclosure contents of these applications are herewith incorporated by reference into the present application.

TECHNICAL FIELD

The present disclosure relates to detecting devices configured for contactless detection of a used medicament delivery device accommodated in a sharps bin, said medicament delivery device being capable of wireless transmission of signals to be received at the detecting device for detecting the medicament delivery device in the sharps bin.

BACKGROUND

Used medicament delivery devices such as for instance injectors are commonly disposed in sharps bins to avoid someone coming into contact with a sharp member, e.g. a needle, of the used medicament delivery devices.

The used medicament delivery device in the sharps bin may be arranged with a tag for wireless communication of adherence data related to an injection therapy provided by the medicament delivery device, such as for example information specifying time stamp of disposal indicating the medicament dose having been delivered, identification of dose delivery or cap removal, or other event associated with the device, batch number, type of drug or device, expiry date of medicament, etc. The tag configured to wirelessly communicate the adherence data may be a so-called radio-frequency identification (RFID) tag.

When reading the adherence data of the used medicament delivery device accommodated in the sharps bin with an appropriate RFID reader in for instance a laboratory or some other adherence data analysis facility, the sharps bin should for safety reasons not be opened and the RFID tag of the medicament delivery device accommodated therein should be read from outside the sharps bin by the RFID reader.

However, in this environment, there may be numerous other RFID-tagged objects in the vicinity of the sharps bin—and thus in the vicinity of the medicament delivery device accommodated therein being subjected to the reading—which may cause interference. Further, in a home environment, reading only the device in the sharps bin reduces the risk of reading an unused device in proximity of the sharps bin and thus mistaking the proximity device for a used one.

This interference may have as a consequence that personnel holding the RFID tag reader cannot be sure that the received information originates from the intended device in the sharps bin, since the signals received by the RFID reader unintentionally may have been picked up from an adjacent object.

SUMMARY

One objective is to solve, or at least mitigate, this problem in the art and thus to provide an improved detecting device configured for contactless detection of a used medicament delivery device accommodated in a sharps bin.

This objective is attained in a first aspect by a detecting device configured for contactless detection of a used medicament delivery device accommodated in a sharps bin, said medicament delivery device being capable of wireless transmission of signals to be received at the detecting device for detecting the medicament delivery device in the sharps bin. The detecting device comprises at least two receivers configured to wirelessly receive the signals transmitted by the medicament delivery device accommodated in the sharps bin and a processing unit configured to measure a property of a first signal received at a first receiver of the at least two receivers and of a second signal received at a second receiver of the at least two receivers, and to determine whether a measured value of the property of the received first signal and of the received second signal comply with a detection criterion, and if so to conclude that the received first and second signal originates from the medicament delivery device accommodated in the sharps bin.

Advantageously, using at least two receivers to receive signals, for example from an RFID tag of the medicament delivery device, it is possible to discriminate the medicament delivery device from an adjacently located interfering transmitter, since the paths of the signals from the medicament delivery device and the signals from the interfering transmitter differ. This can help with providing adherence data for monitoring whether a user is adhering to a prescribed drug regimen, for example. Alternatively or additionally, this can help with tracing and/or quantifying device disposal and usage, which can support medicament delivery device take-back for sustainability purposes (for example to help with tracking of medicament delivery devices for recycling or reuse).

In an embodiment, the signal property comprises signal strength and/or signal phase.

In an embodiment, the processing unit is configured to measure a value of the strength of the received first signal and of the received second signal and wherein said detection criterion is considered to be complied with if the value of the first signal strength and the value of the second signal strength exceed an expected signal strength threshold value.

In an embodiment, the expected signal strength threshold value is set by using previously measured signal strength values of a medicament delivery device being accommodated in the sharps bin.

In an embodiment, the processing unit is configured to measure a value of the strength of the received first signal and of the received second signal and wherein said detection criterion is considered to be complied with if at least one of the value of the first signal strength and the value of the second signal strength exceeds a value of strength of a signal received by the first receiver and the second receiver from an interfering transmitter by a predetermined signal discrimination threshold value.

In an embodiment, the processing unit is configured to measure the phase of the received first signal relative to the received second signal and wherein said detection criterion is considered to be complied with if a value of a phase difference between the received first signal and the received second signal does not exceed an expected phase difference threshold value.

In an embodiment, the expected phase difference threshold value is set by using a previously measured signal phase difference value of a medicament delivery device being accommodated in the sharps bin.

In an embodiment, the at least two receivers are arranged to be directed towards the sharps bin when being operated to detect a medicament delivery device accommodated therein.

In an embodiment, the at least two receivers are configured to receive radio frequency (RF) signals, inductive-coupling signals, capacitive-coupling signals or ultrasound signals.

In an embodiment, the detecting device further comprises a support plate on which the sharps bin is arranged to be placed during operation of the detecting device.

In an embodiment, the support plate is configured to be circularly shaped with the receivers arranged around a periphery of the circular support plate.

In an embodiment, the detecting device further comprises a main body on top of which the support plate is arranged.

In an embodiment, the detecting device further comprises a sensor arranged in the main body and configured to sense that the sharps bin is being placed on the support plate and to signal the sensing to the processing unit.

In an embodiment, the processing unit is configured to activate said at least two receivers to receive signals upon the sensor signalling that the sharps bin is being placed on the support plate. In an embodiment the detecting device further comprises a displacing member arranged in the main body and configured to displace the supporting plate upon the sharps bin being placed on the supporting plate, wherein the processing unit further is configured to conclude, from a change in the measured property of a received signal caused by the displacement of the sharps bin, that the received signal originates from the medicament delivery device accommodated in the sharps bin.

In an embodiment, the displacing member comprises a spring configured to resiliently displace the support plate in a vertical direction or a motor configured to rotationally displace the support plate.

In an embodiment, a side of each of said at least two receivers facing away from the sharps bin is arranged with protective coating to prevent said at least two receivers from receiving signals from objects not being accommodated in the sharps bin.

In an embodiment, said at least two receivers are arranged on the support plate such that the said at least two receivers and the support plate forms a parabolic antenna.

This objective is attained in a second aspect by a detecting device configured for contactless detection of a used medicament delivery device accommodated in a sharps bin, said medicament delivery device being capable of wireless transmission of signals to be received at the detecting device for detecting the medicament delivery device in the sharps bin. The detecting device comprises at least one receiver configured to wirelessly receive the signals transmitted by the medicament delivery device accommodated in the sharps bin, a support plate on which the sharps bin is arranged to be placed during operation of the detecting device, a main body on top of which the support plate is arranged, the main body comprising a displacing member configured to displace the supporting plate upon the sharps bin being placed on the supporting plate, and a processing unit configured to measure a property of a signal received at said at least one receiver and to conclude, from a change in the measured property of the received signal caused by the displacement of the sharps bin, that the received signal originates from the medicament delivery device accommodated in the sharps bin.

Advantageously, displacement of the support plate will have as a result that the measured property—e.g. signal strength—will vary accordingly for the signals received at the receiver, while the position of an interfering transmitter is fixed resulting in a fixed signal strength being measured.

In an embodiment, the support plate is configured to be circularly shaped with the at least one receiver arranged around at a periphery of the circular support plate.

In an embodiment, the detecting device further comprises a sensor arranged in the main body and configured to sense that the sharps bin is being placed on the support plate and to signal the sensing to the processing unit.

In an embodiment, the processing unit is configured to activate said at least one receiver to receive signals upon the sensor signalling that the sharps bin is being placed on the support plate.

In an embodiment, the displacing member comprising a spring configured to resiliently displace the support plate in a vertical direction or a motor configured to rotationally displace the support plate.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
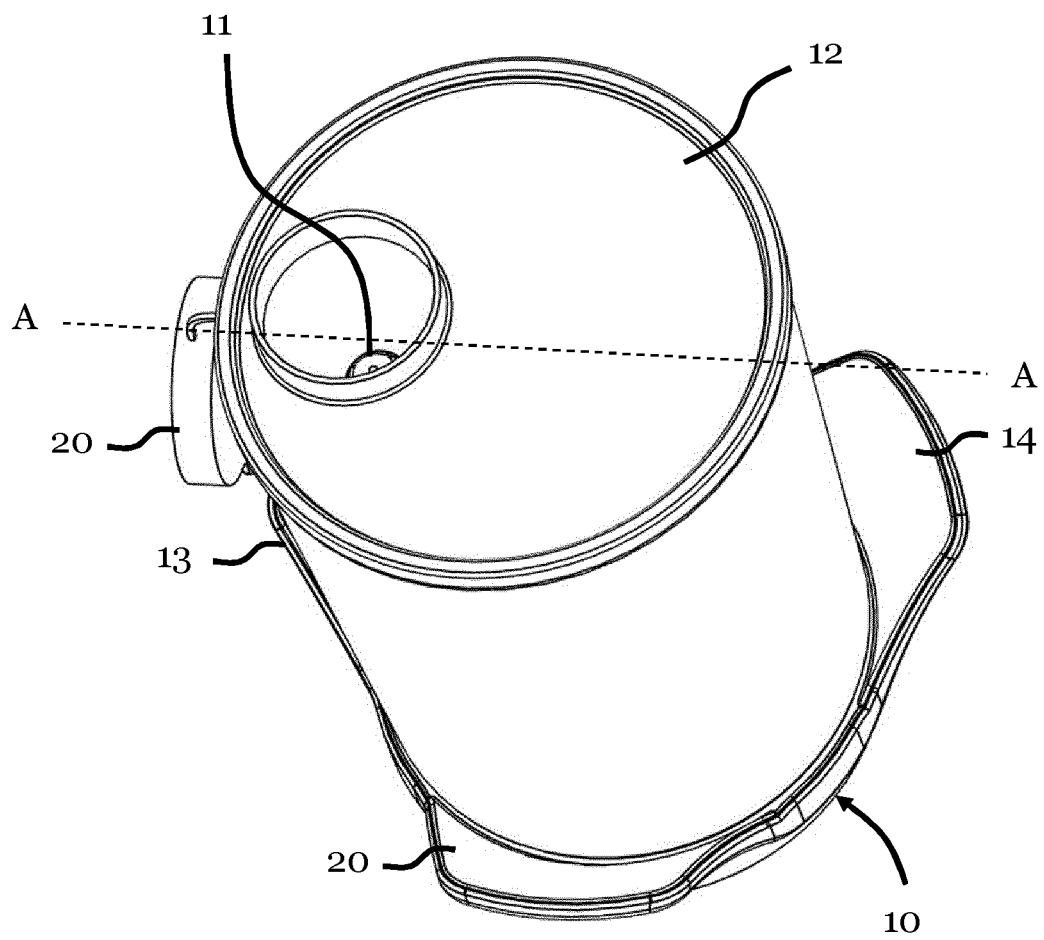
FIG. 1 shows a perspective view of a detecting device according to an embodiment on which a sharps bin accommodating a used medical delivery device is placed.

FIG. 1 shows a perspective view of a detecting device 10 according to an embodiment on which a sharps bin 12 accommodating a used medical delivery device 11 is placed. The sharps bin 12 comprises an opening into which the used medical delivery device 11 is entered for disposal inside the sharps bin 12. The sharps bin 12 is further arranged with a cover 19 for closing the opening.

The detecting device 10 comprises at least two receivers 13, 14 (and in this exemplifying embodiment a third receiver 20) configured to wirelessly receive signals transmitted by the medicament delivery device 11 accommodated in the sharps bin 12. The signals may be RF signals, inductive-coupling signals, capacitive-coupling signals, ultrasound signals, etc.

In the following, the wireless signals are assumed to be RF signals, and the medical delivery device 11 is equipped with an RFID tag 21 for transmitting such RF signals. The receivers 13, 14 may thus be antennas capable of receiving the RF signals.

Figure 2:
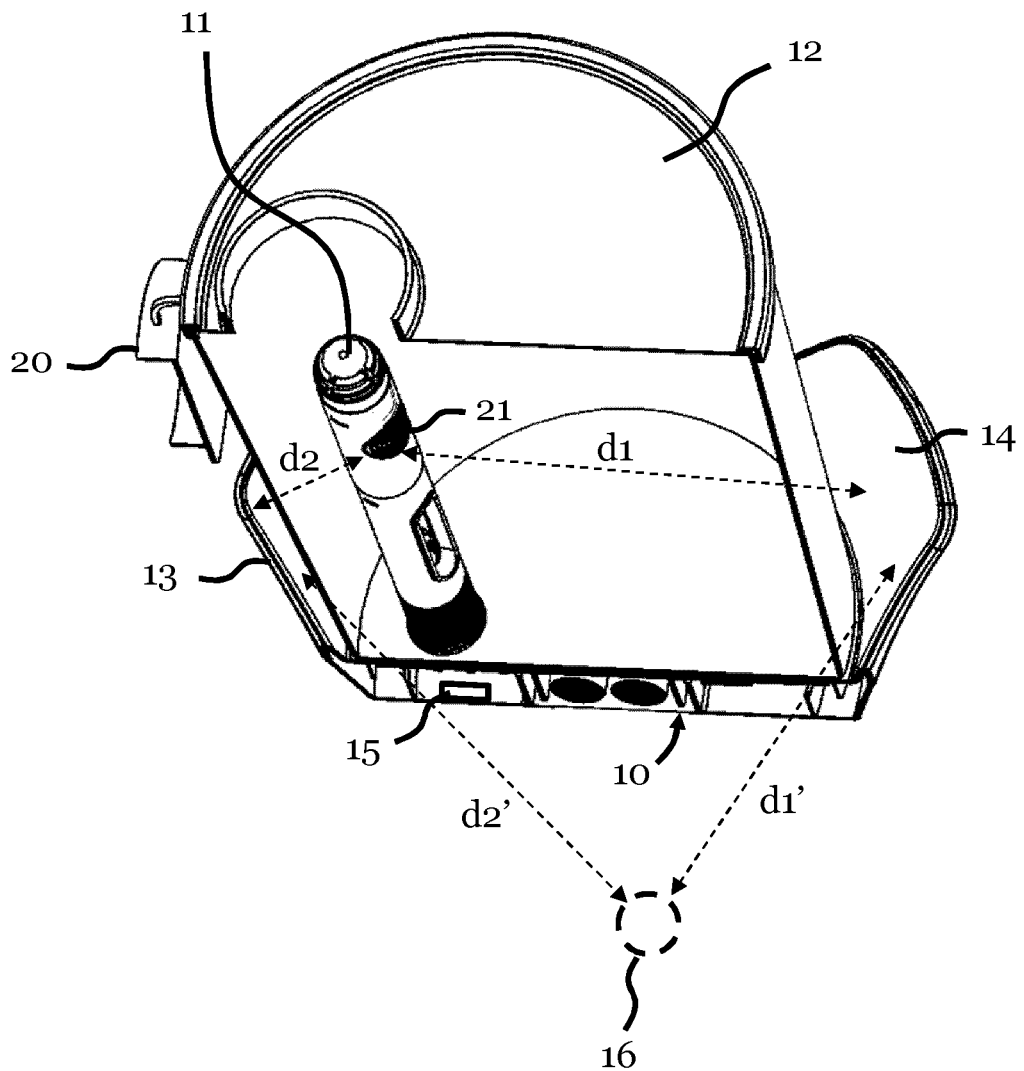
FIG. 2 shows a section of the detecting device and the sharps bin of FIG. 1 taken along line A-A.

FIG. 2 shows a section of the detecting device 10 and the sharps bin 12 of FIG. 1 taken along line A-A, where it can be seen that the detecting device 10 comprises a third antenna 20.

In an embodiment, the three antennas 13, 14, 20 are arranged to be directed towards the sharps bin 12 to better detect the medicament delivery device 11 accommodated therein. Nevertheless, for brevity, detection of the user medicament delivery device 10 using two antennas-first antenna 13 and second antenna 14—will be described in the following.

The antennas 13, 14, 20 may be directional antennas, such as Yagi-antennas, with a limited reading angle to minimize any readings originating from outside the sharps bin 12.

Further, the detecting device 10 comprises a processing unit 15 such as a microprocessor, a digital signal processor (DSP), an application specific integrated circuit (ASIC), a field-programmable gate array (FPGA), a complex programmable logic device (CPLD), etc, being in communicative connection with the antennas 13, 14, 20.

Now, the processing unit 15 is configured to measure a property of a first signal received at the first antenna 13 and of a second signal received at a second antenna 14. Measured properties include signal strength and/or signal phase as will be described in the following. In a first example, the property is embodied in the form of signal strength.

Thereafter, the processing unit 15 determines whether a measured value of the signal strength of the received first signal and a measured value of the signal strength of the received second signal comply with a detection criterion.

If so, the processor unit 15 concludes that the received first and second signal originates from the medicament delivery device 11 accommodated in the sharps bin 12.

This will be explained in more detail hereinbelow assuming that an interfering transmitter 16 is located in vicinity of the detecting device 10.

In an embodiment, the strength of the two signals is measured and if the strength of both signals exceeds an expected threshold value as determined by the detection criterion, then the processor unit 15 concludes that two signals must originate from the medicament delivery device 11 inside the sharps bin 12.

If not, it would be an object located "far away", i.e. an object transmitting signals of a strength not exceeding the expected threshold value. Thus, even if the interfering transmitter 16 of FIG. 2 would be located such that d1=d1', which has as an effect that the first antenna 13 picks up a signal from the interfering transmitter 16 which is more or less equal in strength of that of the first signal picked up from the medicament delivery device 11 to be detected (and discrimination is not possible), the second receiver 14 would pick up a weak signal from the interfering transmitter 16 (i.e. below the expected threshold value since d2>>d2').

As a consequence, the received "strong" signal at the second receiver 14 (and its weaker counterpart received at the first receiver 13) must emanate from the medicament delivery device 11.

While the processing unit 15 in this example is described to detect the medicament delivery device 11 using only the first antenna 13 and the second antenna 14, it is understood that the detection will be made with even higher accuracy using also signals received at the third antenna 20, since the processor unit 15 then will be able to perform triangulation. For instance, it may be envisaged that the signal strength of the signals received by all three antennas 13, 14, 20 should exceed the expected signal strength threshold value in order for the detection criterion to be complied with.

In an embodiment, the expected signal strength threshold value is set by using previously measured signal strength values of a medicament delivery device 11 being accommodated in the sharps bin 12. The expected signal strength threshold value would then be set in compliance with a real-world scenario.

In a further embodiment, strength of the two signals received at the first antenna 13 and the second antenna 14, respectively, is measured and if the strength of at least one of the two signals exceeds the strength of a corresponding signal received by each of the two antennas 13, 14 from the interfering transmitter 16 by a predetermined signal discrimination threshold value, then the "strong" signal must originate from the medicament delivery device 11 inside the sharps bin 12.

Thus, even if the interfering transmitter 16 of FIG. 2 would be located such that first antenna 13 picks up a signal from the interfering transmitter 16 which is more or less equal in strength of the first signal picked up from the medicament delivery device 11 to be detected (and discrimination is not possible), the second antenna 14 would pick up a strong signal from the medicament delivery device 11 but a weak signal from the interfering transmitter 16.

In other words, since d2>>d2', the strength of the signal from the medicament delivery device 11 received at the second antenna 14 exceeds the strength of the signal from the interfering transmitter 16 by a predetermined signal discrimination threshold value (given that the threshold value is appropriately set).

As previously mentioned, the signal property to be measured may be embodied in the form of signal phase.

In such embodiment, a phase difference between a signal received at the first antenna 13 and a signal received at the second antenna 13 is measured and if the phase difference does not exceed an expected phase difference threshold value, then the signals must originate from the medicament delivery device 11 inside the sharps bin 12.

In contrast, for two signals being picked up by the first antenna 13 and the second antenna 14 from the interfering transmitter 16 being located further away (i.e. at distance d1' and d2' rather than d1 and d2), the phase difference would be greater since d2'>>d2 and thus exceed an expected phase difference threshold value (given that the threshold value is appropriately set).

Similar to the case of signal strength, the expected phase difference threshold value is in an embodiment set by using previously measured phase difference values of a medicament delivery device 11 being accommodated in the sharps bin 12. The expected phase difference threshold value would then be set in compliance with a real-world scenario.

With reference to FIGS. 1 and 2, it is illustrated that the sharps bin 12 is placed on the detecting device 10 for performing the RFID tag reading. However, it may be envisaged that the detecting device 10 is placed on top of the sharps bin 12 or even held by a user close to a side wall of the sharps bin 12 to perform the reading.

Figure 3:
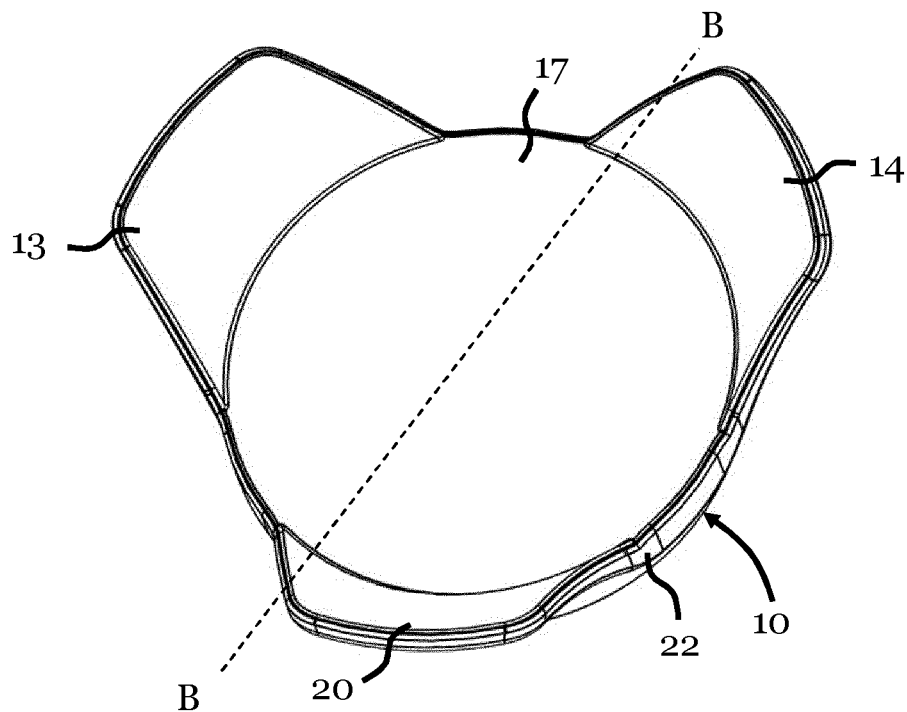
FIG. 3 shows a perspective view of the detecting device 10 of FIG. 1 according to an embodiment.

FIG. 3 shows a perspective view of the detecting device 10 of FIGS. 1 and 2 with the sharps bin 12 removed. As shown, the detecting device 10 comprises a support plate 17 on which the sharps bin 12 is arranged to be placed during operation of the detecting device 10.

In this embodiment, the support plate 17 is configured to be circularly shaped with the antennas 13, 14, 20 arranged around a periphery of the circular support plate 17, thereby forming a parabolic antenna. Further, the support plate 17 is arranged on top of a main body 220f the detecting device 10.

Figure 4:
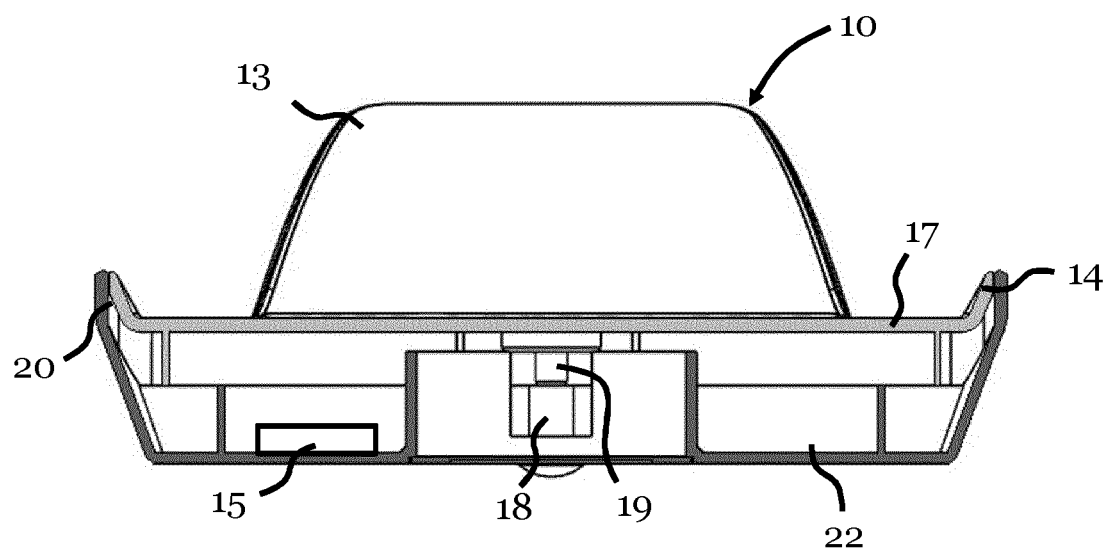
FIG. 4 shows a section of the detecting device of FIG. 3 taken along line B-B.

FIG. 4 shows a section of the detecting device 10 of FIG. 3 taken along line B-B.

In an embodiment the detecting device 10 further comprises a sensor 19 arranged in the main body 22 and configured to sense that the sharps bin 12 is being placed on the support plate 17 and to signal the sensing to the processing unit 15. Advantageously, various components of the detecting device 10 may be power only when the sensor 19 senses a sharps bin 12 being placed on the support plate 17.

Further in an embodiment, the processing unit 15 is configured to activate the antennas 13, 14, 20 to receive signals upon the sensor 19 signalling that the sharps bin 12 is being placed on the support plate 17.

In yet an embodiment, the detecting device 10 further comprises a displacing member 18 configured to displace the supporting plate 17 upon the sharps bin 12 being placed on the supporting plate 17.

The processing unit 15 is configured to conclude from a change in the measured property of a received signal-being e.g. signal strength-caused by the displacement of the sharps bin 12, that the received signal originates from the medicament delivery device 11 accommodated in the sharps bin 12.

For instance, the displacing member 18 may be embodied in the form of a spring causing a resilient vertical displacement of the plate 17 or a motor causing a rotating displacement of the plate 17.

In either of the two scenarios, the temporary displacement in the case of a spring or the more permanent displacement caused by the motor will have as a result that the measured property—e.g. signal strength—will vary accordingly for the signals received at the antennas 13, 14, 20, while the position of an interfering transmitter is fixed resulting in a fixed signal strength being measured. Further, in this embodiment utilizing displacement of the supporting plate 17, only a single receiver/antenna is required to measure the change in the measured property (even though further receivers/antennas indeed may be used). Thus, it is envisaged that the detecting device 10 may be equipped with a single antenna in case the detecting device 10 comprises the displacing member 18.

In order to further prevent the antennas 13, 14, 20 from picking up signals from an interfering transmitter 16, a side of the antennas 13, 14, 20 facing away from the sharps bin 12 is in an embodiment arranged with protective coating.

Further, the main body 22 may comprise a scale (not shown), a reading of which may assist in determined whether or not the sharps bin 12 comprises a medicament delivery device. Thus, in addition to measuring a property of the signals received by the antennas 13, 14, 20 and determining that a detection criterion is complied with, the detection will only be considered successful if the scale reading fulfils a weight criterion. Further, it may be determined from the scale reading whether or not a full dose of the medicament has been delivered.

Figure 5:
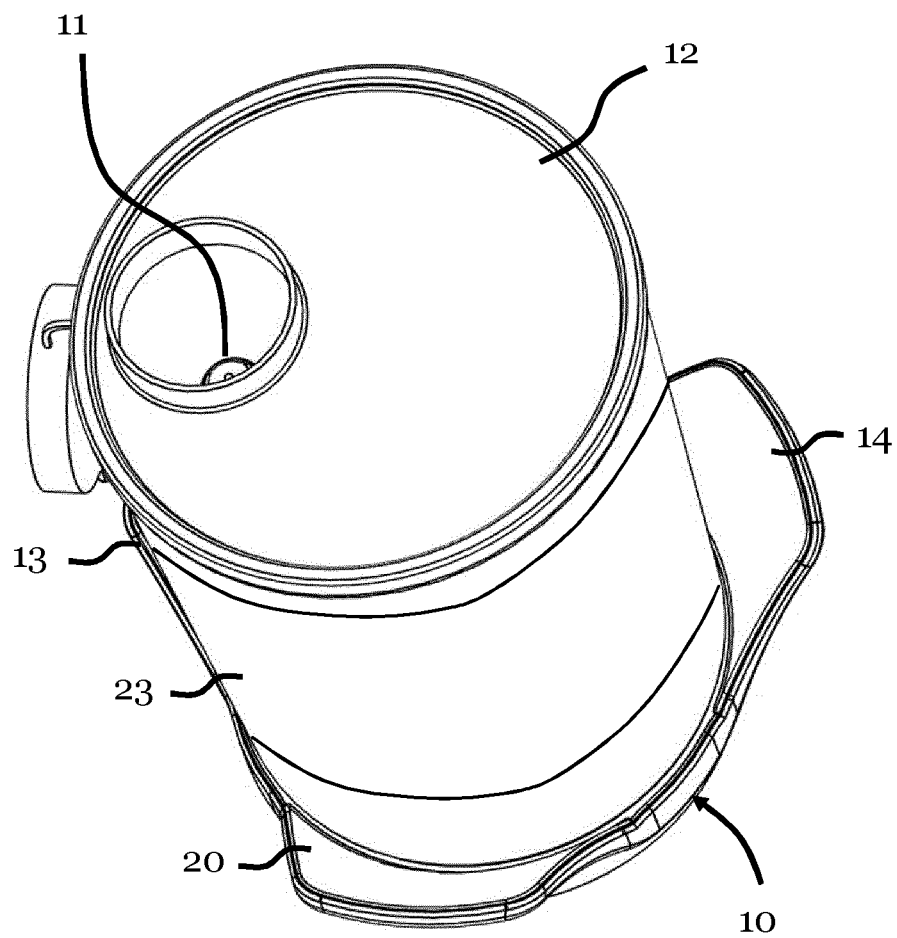
FIG. 5 illustrates an embodiment where most of a side wall of the sharps bin is covered with shielding fabric.

FIG. 5 illustrates an embodiment where most of the side wall of the sharps bin 12 (and possibly even a top section of sharps bin 12) is covered with shielding fabric 23 having metallic fibres or foil embedded into the fabric 23. This is sometimes referred to as faraday fabric or faraday cloth, and prevents the RFID signals of the medicament delivery device 11 from interfering with other adjacent RFID readers. Typically, the lower section of the side wall of the sharps bin 12—i.e. the section facing the antennas 13, 14, 20—is not covered with fabric 23 to avoid attenuating the signals wirelessly received by the antennas 13, 14, 20.

In an alternative embodiment, it may be envisaged that e.g. a pen-shaped variant of the detecting device comprising a single antenna is entered through the opening of the sharps bin 12 to read the RFID tag of the medicament delivery device 11 accommodated therein.

Figure 6:
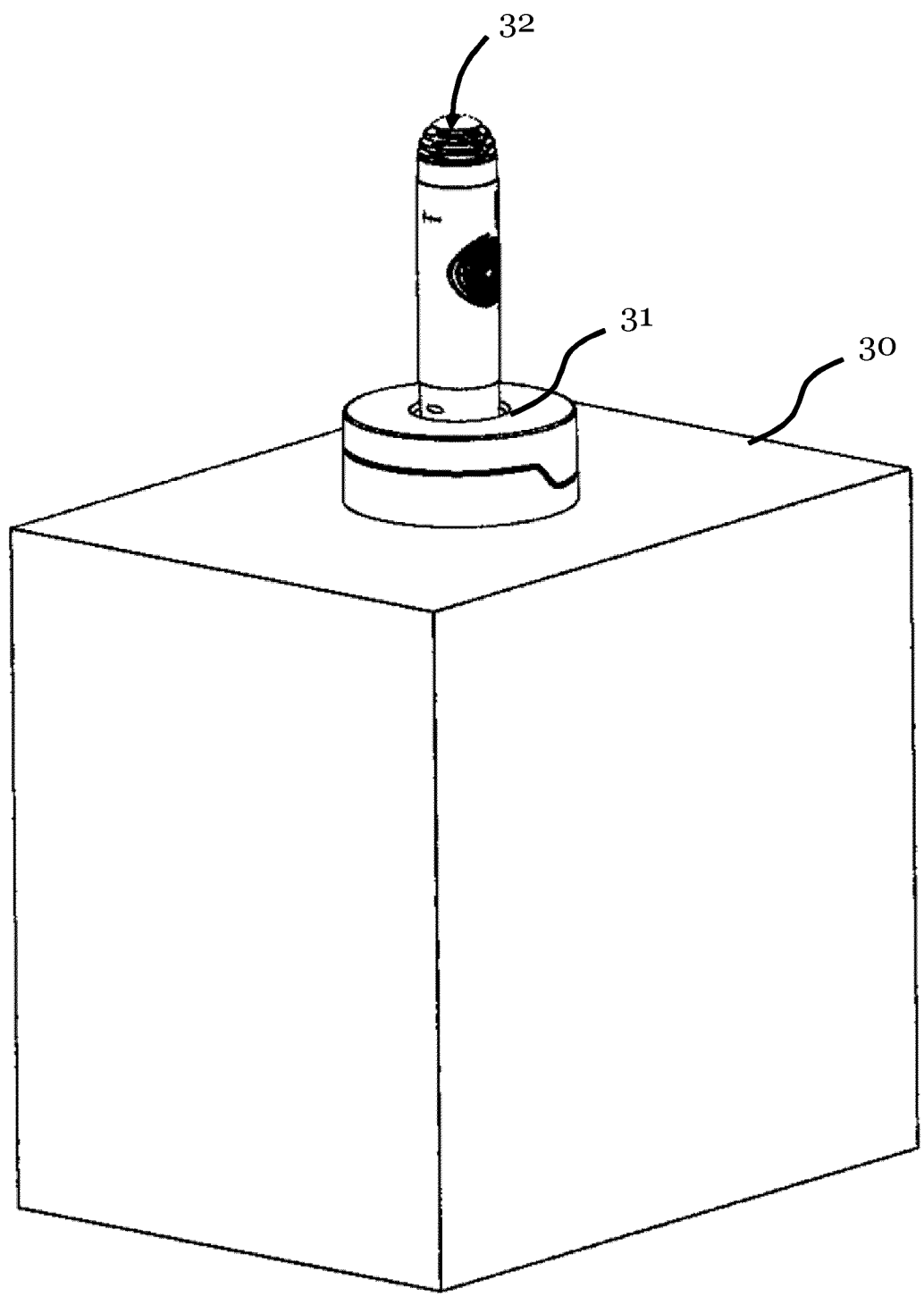
FIG. 6 illustrates a sharps bin contained in a shielded box according to an embodiment.

FIG. 6 further illustrates that with such an alternative solution, the sharps bin could be contained in a shielded box 30 comprising a single opening 31 where the pen-shape detecting device 32 is entered for reading the RFID tag of the of the medicament delivery device accommodated in the sharps bin inside the shielded box 30.

The shielded box 30 may be made of cardboard with an inner layer of aluminium foil. The carton could be a packing for a medicinal product and for example hold standard packages of injection products and serve as a thermal shield during the time between the cold store and the home of the patient Once at the home of the patient, the carton would be used for disposal of auto injectors. The aluminium foil would then serve as an electromagnetic compatibility (EMC) shield preventing a reusable reading module from reading tags of unused products. The carton once full would then be picked up for transport by a pick-up service as a part of a take-back program.

The RFID tags as described herein could be active or passive. If one or more passive RFID tags is used, the passive RFID tag(s) can use the energy emitted from one or more antennas to transmit a signal that is subsequently detected.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

Some aspects of the invention are summarised in the following clauses.

1. A detecting device (10) configured for contactless detection of a used medicament delivery device (11) accommodated in a sharps bin (12), said medicament delivery device (11) being capable of wireless transmission of signals to be received at the detecting device (10) for detecting the medicament delivery device (11) in the sharps bin (12), the detecting device (10) comprising:
at least two receivers (13, 14, 20) configured to wirelessly receive the signals transmitted by the medicament delivery device (11) accommodated in the sharps bin (12); and
a processing unit (15) configured to:
measure a property of a first signal received at a first receiver (13) of the at least two receivers and of a second signal received at a second receiver (14) of the at least two receivers; and to determine whether a measured value of the property of the received first signal and of the received second signal comply with a detection criterion; and if so:

conclude that the received first and second signal originates from the medicament delivery device (11) accommodated in the sharps bin (12).

2. The detecting device (10) of clause 1, the signal property comprising signal strength and/or signal phase.

3. The detecting device (10) of clause 2, the processing unit (15) being configured to:

measure a value of the strength of the received first signal and of the received second signal and wherein said detection criterion is considered to be complied with if the value of the first signal strength and the value of the second signal strength exceed an expected signal strength threshold value.

4. The detecting device (10) of clause 3, wherein the expected signal strength threshold value is set by using previously measured signal strength values of a medicament delivery device (11) being accommodated in the sharps bin (12).

5. The detecting device (10) of clauses 3 or 4, the processing unit (15) being configured to:

measure a value of the strength of the received first signal and of the received second signal and wherein said detection criterion is considered to be complied with if at least one of the value of the first signal strength and the value of the second signal strength exceeds a value of strength of a signal received by the first receiver and the second receiver from an interfering transmitter (16) by a predetermined signal discrimination threshold value.

6. The detecting device (10) of clause 2, the processing unit (15) being configured to:

measure the phase of the received first signal relative to the received second signal and wherein said detection criterion is considered to be complied with if a value of a phase difference between the received first signal and the received second signal does not exceed an expected phase difference threshold value.

7. The detecting device (10) of clause 6, wherein the expected phase difference threshold value is set by using a previously measured signal phase difference value of a medicament delivery device (11) being accommodated in the sharps bin (12).

8. The detecting device (10) of any one of the preceding clauses, wherein said at least two receivers (13, 14) are arranged to be directed towards the sharps bin (12) when being operated to detect a medicament delivery device (11) accommodated therein.

9. The detecting device (10) of any one of the preceding clauses, wherein said at least two receivers (13, 14) are configured to receive radio frequency, RF, signals, inductive-coupling signals, capacitive-coupling signals or ultrasound signals.

10. The detecting device (10) of any one of the preceding clauses, further comprising:

a support plate (17) on which the sharps bin (12) is arranged to be placed during operation of the detecting device (10).

11. The detecting device (10) of clause 10, the support plate (17) being configured to be circularly shaped with the receivers (13, 14, 20) arranged around a periphery of the circular support plate (17).

12. The detecting device (10) of clauses 10 or 11, further comprising:

a main body (22) on top of which the support plate (17) is arranged.

13. The detecting device (10) of clause 12, further comprising:

a sensor (19) arranged in the main body (22) and configured to sense that the sharps bin (12) is being placed on the support plate (17) and to signal the sensing to the processing unit (15).

14. The detecting device (10) of clause 11, wherein the processing unit (15) is configured to activate said at least two receivers (13, 14, 20) to receive signals upon the sensor (19) signalling that the sharps bin (12) is being placed on the support plate (17).

15. The detecting device (10) of any one of clauses 10-14, further comprising:

a displacing member (18) arranged in the main body (22) and configured to displace the supporting plate (17) upon the sharps bin (12) being placed on the supporting plate (17), the processing unit (15) further being configured to:

conclude, from a change in the measured property of a received signal caused by the displacement of the sharps bin (12), that the received signal originates from the medicament delivery device (11) accommodated in the sharps bin (12).

16. The detecting device (10) of clause 15, the displacing member (18) comprising a spring configured to resiliently displace the support plate (17) in a vertical direction or a motor configured to rotationally displace the support plate (17).

17. The detecting device (10) of any one of the preceding clauses, wherein a side of each of said at least two receivers (13, 14) facing away from the sharps bin (12) is arranged with protective coating to prevent said at least two receivers (13, 14) from receiving signals from objects (16) not being accommodated in the sharps bin (12).

18. A detecting device (10) of any one of clauses 10-17, wherein said at least two receivers (13, 14) are arranged on the support plate (17) such that the said at least two receivers (13, 14) and the support plate (17) forms a parabolic antenna.

The invention claimed is:

1. A detecting device configured for contactless detection of a used medicament delivery device accommodated in a sharps bin, said medicament delivery device being capable of wireless transmission of signals to be received at the detecting device for detecting the medicament delivery device in the sharps bin, the detecting device comprising:

at least two receivers configured to wirelessly receive the signals transmitted by the medicament delivery device accommodated in the sharps bin, wherein said at least two receivers are arranged to be directed towards the sharps bin when being operated to detect a medicament delivery device accommodated therein; and a processing unit configured to:

measure a property of a first signal received at a first receiver of the at least two receivers and of a second signal received at a second receiver of the at least two receivers;

determine whether a measured value of the property of the received first signal and of the received second signal comply with a detection criterion; and if so:

conclude that the received first and second signal originates from the medicament delivery device accommodated in the sharps bin.

2. The detecting device of claim 1, wherein the property of the first signal received and the second signal received comprising signal strength and/or signal phase.

3. The detecting device of claim 2, wherein the processing unit being configured to:
measure a value of the strength of the received first signal and of the received second signal and wherein said detection criterion is considered to be complied with if the value of the first signal strength and the value of the second signal strength exceed an expected signal strength threshold value.

4. The detecting device of claim 3, wherein the expected signal strength threshold value is set by using previously measured signal strength values of a medicament delivery device being accommodated in the sharps bin.

5. The detecting device of claim 3, wherein the processing unit being configured to:
measure a value of the strength of the received first signal and of the received second signal and wherein said detection criterion is considered to be complied with if at least one of the value of the first signal strength and the value of the second signal strength exceeds a value of strength of a signal received by the first receiver and the second receiver from an interfering transmitter by a predetermined signal discrimination threshold value.

6. The detecting device of claim 2, wherein the processing unit being configured to:
measure the phase of the received first signal relative to the received second signal and wherein said detection criterion is considered to be complied with if a value of a phase difference between the received first signal and the received second signal does not exceed an expected phase difference threshold value.

7. The detecting device of claim 6, wherein the expected phase difference threshold value is set by using a previously measured signal phase difference value of a medicament delivery device being accommodated in the sharps bin.

8. The detecting device of claim 1, wherein said at least two receivers are configured to receive radio frequency (RF) signals, inductive-coupling signals, capacitive-coupling signals or ultrasound signals.

9. The detecting device of claim 1, further comprising:
a support plate on which the sharps bin is arranged to be placed during operation of the detecting device.

10. A detecting device configured for contactless detection of a used medicament delivery device accommodated in a sharps bin, said medicament delivery device being capable of wireless transmission of signals to be received at the detecting device for detecting the medicament delivery device in the sharps bin, the detecting device comprising:
at least one receiver configured to wirelessly receive the signals transmitted by the medicament delivery device accommodated in the sharps bin;
a support plate on which the sharps bin is arranged to be placed during operation of the detecting device;
a main body on top of which the support plate is arranged; the main body comprising:
a displacing member configured to displace the supporting plate upon the sharps bin being placed on the supporting plate, and
a processing unit configured to:
measure a property of a signal received at said at least one receiver; and to:
conclude, from a change in the measured property of the received signal caused by the displacement of the sharps bin, that the received signal originates from the medicament delivery device accommodated in the sharps bin.

11. The detecting device of claim 10, wherein the support plate being configured to be circularly shaped with the at least one receiver arranged around at a periphery of the circular support plate.

12. The detecting device of claim 10, further comprising:
a sensor arranged in the main body and configured to sense that the sharps bin is being placed on the support plate and to signal the sensing to the processing unit.

13. The detecting device of claim 12, wherein the processing unit is configured to activate said at least one receiver to receive signals upon the sensor signaling that the sharps bin is being placed on the support plate.

14. The detecting device of claim 10, wherein the displacing member comprising a spring configured to resiliently displace the support plate in a vertical direction or a motor configured to rotationally displace the support plate.

* * * * *